ами
United States Patent

Takahashi et al.

(10) Patent No.: US 10,021,646 B2
(45) Date of Patent: Jul. 10, 2018

(54) COMMUNICATION APPARATUS, METHOD OF CONTROLLING A COMMUNICATION APPARATUS, AND STORAGE MEDIUM

(71) Applicant: CANON KABUSHIKI KAISHA, Tokyo (JP)

(72) Inventors: Takumi Takahashi, Fuchu (JP); Nobuhiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 15/145,377

(22) Filed: May 3, 2016

(65) Prior Publication Data

US 2016/0249291 A1 Aug. 25, 2016

Related U.S. Application Data

(63) Continuation of application No. 14/626,118, filed on Feb. 19, 2015, now Pat. No. 9,363,757.

(30) Foreign Application Priority Data

Feb. 25, 2014 (JP) .................................. 2014-034709
Jan. 14, 2015 (JP) .................................. 2015-005290

(51) Int. Cl.
*H04B 5/00* (2006.01)
*H04W 52/02* (2009.01)
(Continued)

(52) U.S. Cl.
CPC ......... *H04W 52/0229* (2013.01); *H04W 4/80* (2018.02); *H04W 52/0235* (2013.01);
(Continued)

(58) Field of Classification Search
USPC ........ 455/41.1–41.3, 550.1, 552.1, 436, 448, 455/449
See application file for complete search history.

(56) References Cited

U.S. PATENT DOCUMENTS

2006/0258323 A1 11/2006 Hara et al.
2011/0212746 A1* 9/2011 Sarkar ............... H04W 52/0274
455/552.1
(Continued)

FOREIGN PATENT DOCUMENTS

JP 2005-223822 A 8/2005
JP 2007258984 A 10/2007
(Continued)

OTHER PUBLICATIONS

Bluetooth Profile Specification, "Alert Notification Profile", Technical Specification, 2011, pp. 1-19.
(Continued)

*Primary Examiner* — Fayyaz Alam
(74) *Attorney, Agent, or Firm* — Carter, DeLuca, Farrell & Schmidt, LLP

(57) ABSTRACT

A communication apparatus, comprising: first and second communication units; third communication unit for performing a communication of data, wherein the second communication unit performs a predetermined communication for activating the third communication unit and has a communication speed slower than and a power consumption less than the third communication unit, wherein the first communication unit has a communication range shorter than the third and second communication unit; reception unit for, if a communication with a communication partner apparatus is initiated by the first communication unit, receiving information relating to the communication partner apparatus by the first communication unit; and selection unit for, based on the received information, selecting whether to initiate data communication by the third or second communication unit.

16 Claims, 4 Drawing Sheets

(51) Int. Cl.
*H04W 4/80* (2018.01)
*H04W 76/14* (2018.01)
*H04W 36/00* (2009.01)
*H04W 84/12* (2009.01)

(52) U.S. Cl.
CPC ... *H04W 52/0254* (2013.01); *H04W 52/0261* (2013.01); *H04W 76/14* (2018.02); *H04W 36/0016* (2013.01); *H04W 52/0216* (2013.01); *H04W 84/12* (2013.01); *Y02D 70/00* (2018.01); *Y02D 70/142* (2018.01); *Y02D 70/144* (2018.01); *Y02D 70/166* (2018.01)

(56) References Cited

U.S. PATENT DOCUMENTS

2015/0230283 A1* 8/2015 Li .................. H04W 76/023
 455/41.1
2015/0281880 A1* 10/2015 Song ................. H04B 7/26
 455/41.2
2015/0282033 A1* 10/2015 Lunden ............ H04W 36/0055
 455/436

FOREIGN PATENT DOCUMENTS

| JP | 2007-306201 A | 11/2007 |
|---|---|---|
| JP | 2011-259172 A | 12/2011 |
| JP | 2013-009174 A | 1/2013 |
| JP | 2013-126152 A | 6/2013 |
| JP | 2013-179582 A | 9/2013 |

OTHER PUBLICATIONS

Adaptive Communications Research Laboratories, retrieved from http://www.acr.atr.jp/research/#rod (Feb. 2015), pp. 1-4.

Near Field Communication (NFC) Forum, pages retrieved from http://www.nfc-forum.org (Feb. 2015), pp. 1-13.

European Search Report issued in corresponding application No. 15156560.3 dated Jul. 20, 2015.

* cited by examiner

COMMUNICATION APPARATUS, METHOD OF CONTROLLING A COMMUNICATION APPARATUS, AND STORAGE MEDIUM

CROSS REFERENCE TO RELATED APPLICATIONS

This application is a continuation of U.S. patent application Ser. No. 14/626,118, filed Feb. 19, 2015, which claims the benefit of and priority to Japanese Patent Application No. 2014-034709, filed Feb. 25, 2014, and Japanese Patent Application No. 2015-005290, filed Jan. 14, 2015, the entire contents of each of which are hereby incorporated by reference herein in their entireties.

BACKGROUND OF THE INVENTION

Field of the Invention

The present invention relates to a communication apparatus, a method of controlling a communication apparatus, and a storage medium, and in particular relates to a technique for controlling activation and stopping of each communication interface in a communication apparatus equipped with a plurality of wireless communication interfaces including a wireless LAN with an object of reducing power consumption.

Description of the Related Art

As an approach for power saving control when not yet communicating by a wireless LAN interface, a "Radio On Demand Network" technique of activating a host system when a "Wake On WLAN" or a specific wake up signal is received which developed a sleep mechanism has been proposed (adaptive communication research center, "unnecessary power consumption reducing Radio On Demand Networks", http://www.acr.atr.jp/research/#rod/). Also, an "Alert Notification Profile" for notifying an opposing apparatus of the occurrence of an event using Bluetooth (registered trademark) 4.0 LE, for which power consumption is small compared to a wireless LAN interface, as a wireless communication medium is standardized (BLUETOOTH PROFILE SPECIFICATION, "Alert Notification Profile", Technical Specification).

Also, a protocol for handing over to a differing wireless communication method such as, for example, wireless LAN, Bluetooth, from NFC (Near Field Communication) is standardized by the NFC Forum (NFC Forum, http://www.nfc-forum.org/home/). By realizing a handover using NFC, a high speed a communication path of wireless LAN or Bluetooth is established by two smartphones simply approaching each other, and a large amount of data can be transmitted/received. In recent years, commercialization of a wireless combination chip combining a plurality of wireless communication functions of NFC, wireless LAN, and Bluetooth are being investigated by chip makers.

In Japanese Patent Laid-Open No. 2007-306201, an ad hoc connection wireless communication system wherein an inactive state is set other than during a communication processing interval in which processing necessary for the data communication is performed, using a low-power communication unit capable of wireless communication with another information terminal apparatus by a power consumption less than that of a data communication unit is disclosed.

In Japanese Patent Laid-Open No. 2011-259172, a communication apparatus that transmits a switching signal for switching between a normal mode and a power saving mode of a second communication unit (WLAN) by a signal received intermittently by a first communication unit (BAN: Body Area Network) is disclosed.

In Japanese Patent Laid-Open No. 2007-258984, a wireless communication apparatus that transmits a control signal which is a power on signal to a content reproduction apparatus by an infrared communication unit and also initiates activation processing for a Bluetooth communication unit when a power source is turned on is disclosed.

In this way, in a portable communication apparatus that operates by a battery, control is desired in which, when a power saving operation is requested, a wireless LAN interface in particular is only caused to operate when necessary data communication is performed, and for an interval other than this, the wireless LAN interface is stopped.

In a case where pairing is executed by an NFC handover, while connection can be performed wirelessly between apparatuses by a method such as wireless LAN, Bluetooth, for example, it is unclear at what timing the data transfer is initiated on each of the communication apparatuses. Accordingly, even though the data transfer does not start, a wireless communication function such as wireless LAN, or Bluetooth remains activated and waiting after the handover. In such a case, in a portable type communication apparatus in particular, in a communication standby state other than one in which data transfer is being performed, an unnecessary consumption of power occurs.

SUMMARY OF THE INVENTION

The present invention provides a technique for reducing consumption of power in a standby state other than a state in which data transfer is being performed in view of the above described problems.

According to one aspect of the present invention, there is provided a communication apparatus, comprising: a first wireless communication unit; a second wireless communication unit; a third wireless communication unit configured to perform data communication, wherein the second wireless communication unit is operable to perform a communication for activating the third wireless communication unit and has a communication speed that is slower than that of the third wireless communication unit and a power consumption less than that of the third wireless communication unit, wherein the first wireless communication unit has a communication range that is less than that of the third wireless communication unit and that of the second wireless communication unit; a reception unit configured to, in a case where the first wireless communication unit initiates a communication with a communication partner apparatus, receive information relating to the communication partner apparatus from the first wireless communication unit; and a selection unit configured to, based on the information relating to the communication partner apparatus received by the reception unit, select one of initiating data communication by the third wireless communication unit or initiating communication by the second wireless communication unit.

Further features of the present invention will be apparent from the following description of embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<1. Communication System Example Configuration>

First, with reference to FIG. 1, explanation will be given for an example configurations and use case of a communication system according to an embodiment of the present invention. The communication system has a communication apparatus 100 and a communication apparatus 200. The communication apparatus 100 and the communication apparatus 200 are both communication apparatuses equipped with a plurality of wireless communication units which are for NFC (Near Field Communication) (a first wireless communication unit), Bluetooth (a second wireless communication unit), and WLAN (a third wireless communication unit), and both perform control for activating and stopping each of the wireless communication units in order to reduce power consumption. WLAN is an abbreviation of Wireless LAN, and in this embodiment communication is performed by a communication scheme compliant with an IEEE 802.11 series. Note, in this embodiment, it is assumed that power consumption is larger, and faster communication is possible in the WLAN communication than in the Bluetooth communication. The communication apparatus 100 may be a smartphone, for example, and the communication apparatus 200 may be a digital camera, for example. Note, that the communication range of NFC is shorter than for WLAN communication and Bluetooth communication. With NFC, a communication connection is established automatically when apparatuses move close to each other.

In the present embodiment, between the communication apparatus 100 and the communication apparatus 200, after executing pairing between the communication apparatuses using an NFC communication path, a data transfer service using a WLAN communication path is performed. Explanation will be given for an example in which, after this, after switching the communication path to Bluetooth, both communication apparatuses transition to a standby state in order to reduce power consumption.

Figure 1:
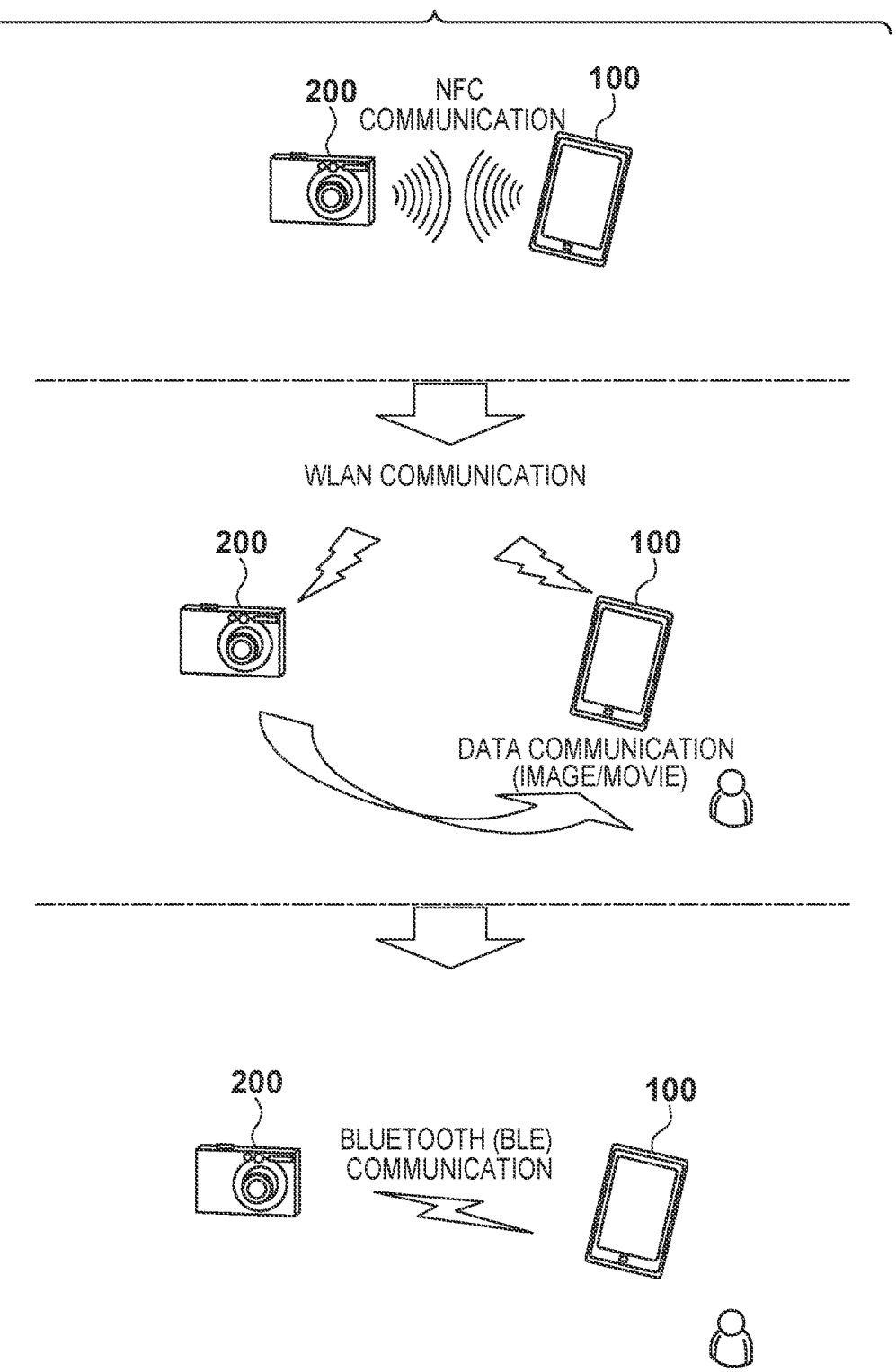
FIG. 1 is a view for showing an example configuration and use case of a communication system according to an embodiment of the present invention.

In FIG. 1, firstly, a user activates an application of the communication apparatus 100, and a data transfer of an image or a movie in the communication apparatus 200 is performed from the communication apparatus 200 to the communication apparatus 100. The application prompts the user to cause the communication apparatus 100 and the communication apparatus 200 to approach each other and touch. By this touch operation, NFC is activated, and by an NFC communication path, an operation request that the application of the communication apparatus 100 makes and apparatus information is transferred to the partner communication apparatus 200. Because this application requests data transfer of the image or the movie, the communication apparatus 200 selects, as a communication path, WLAN which is suitable for the data transfer and activates WLAN.

When the WLAN communication path is established, the communication apparatus 200 transfers the image or the movie data to the communication apparatus 100, and when the data transfer processing ends, the communication apparatus 200 disconnects the WLAN communication path. In a case where the user or the application continues to perform data transfer, the power for WLAN, for which power consumption is high, is temporarily turned off in order to reduce the consumption of power, and the communication path is switched to Bluetooth for which power consumption is low. In Bluetooth, in recent years a standard called Bluetooth Low Energy (BLE) for which power consumption is low has been standardized, and the intended uses of BLE have spread to monitoring a communication path upon this kind of communication disconnection and restarting communication.

<2. Communication Apparatus Functional Configuration>

Figure 2:
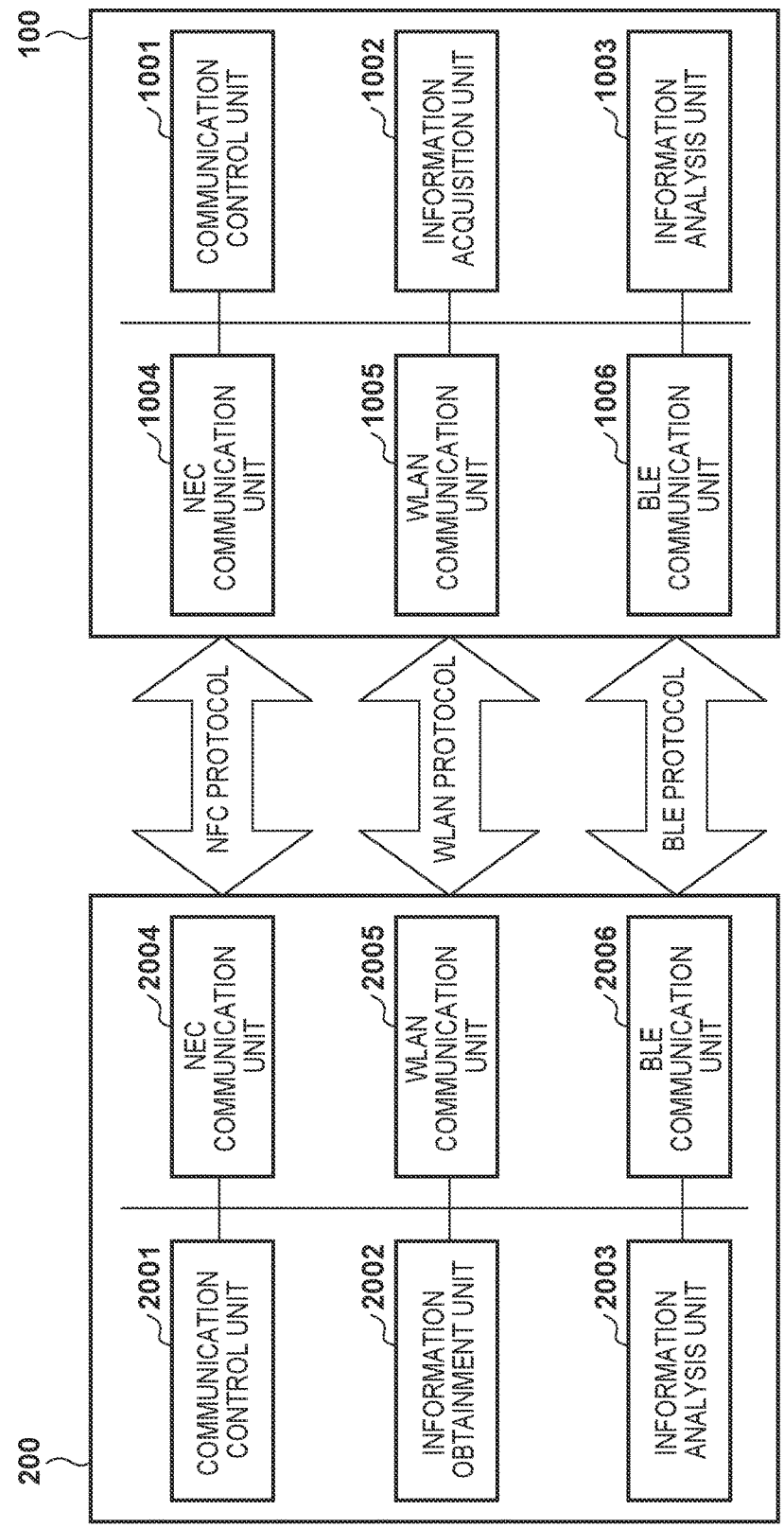
FIG. 2 is a functional block diagram of communication apparatuses according to an embodiment of the present invention.

FIG. 2 is a functional block diagram for the communication apparatus 100 and the communication apparatus 200. The communication apparatus 100 is equipped with a communication control unit 1001, an information obtainment unit 1002, an information analysis unit 1003, an NFC communication unit 1004, a WLAN communication unit 1005, and a BLE communication unit 1006.

The communication control unit 1001 controls the processing units in order to operate a communication application for performing data reception. The information obtainment unit 1002 obtains various items of information from the other communication apparatus using one of the communication units. The information analysis unit 1003 analyzes various items of information obtained from the other communication apparatus. The NFC communication unit 1004 is a wireless communication unit that has a function for realizing NFC communication, and is used in order to exchange communication parameters used by the wireless communication units. Note, the communication parameters are information used for a wireless connection between the apparatuses. For example, communication parameters used for the WLAN communication are an SSID, an authentication mode, an authentication key, an encryption scheme, an encryption key, a MAC address. Also, communication parameters used for the Bluetooth communication are a Bluetooth address, a link key, a frequency hopping pattern, an authentication mode, an authentication key, an encryption scheme, an encryption key. All or a part of these communication parameters may be included. The WLAN communication unit 1005 is a wireless communication unit having a function for realizing WLAN communication. The BLE communication unit 1006 is a wireless communication unit having a function for realizing BLE communication. Note, the communication control unit 1001 realizes the operation of each processing unit by reading out and executing a program stored in a storage unit (not shown).

Similarly, the communication apparatus 200 is equipped with a communication control unit 2001, an information obtainment unit 2002, an information analysis unit 2003, an NFC communication unit 2004, a WLAN communication unit 2005, and a BLE communication unit 2006. The communication control unit 2001 controls the processing units in order to operate a communication application for performing data transmission. Because the operation of the other processing units is the same as the operation of the processing units corresponding to the communication apparatus 100, explanation of these will be omitted.

Note, the configuration of the functional blocks above is only an example, and a configuration may be taken so as to configure a plurality of functional blocks from a single functional block, and a functional block further may be comprised of a plurality of functional blocks that are divided.

<3. Sequence of Control between Communication Apparatuses>

Figure 3:
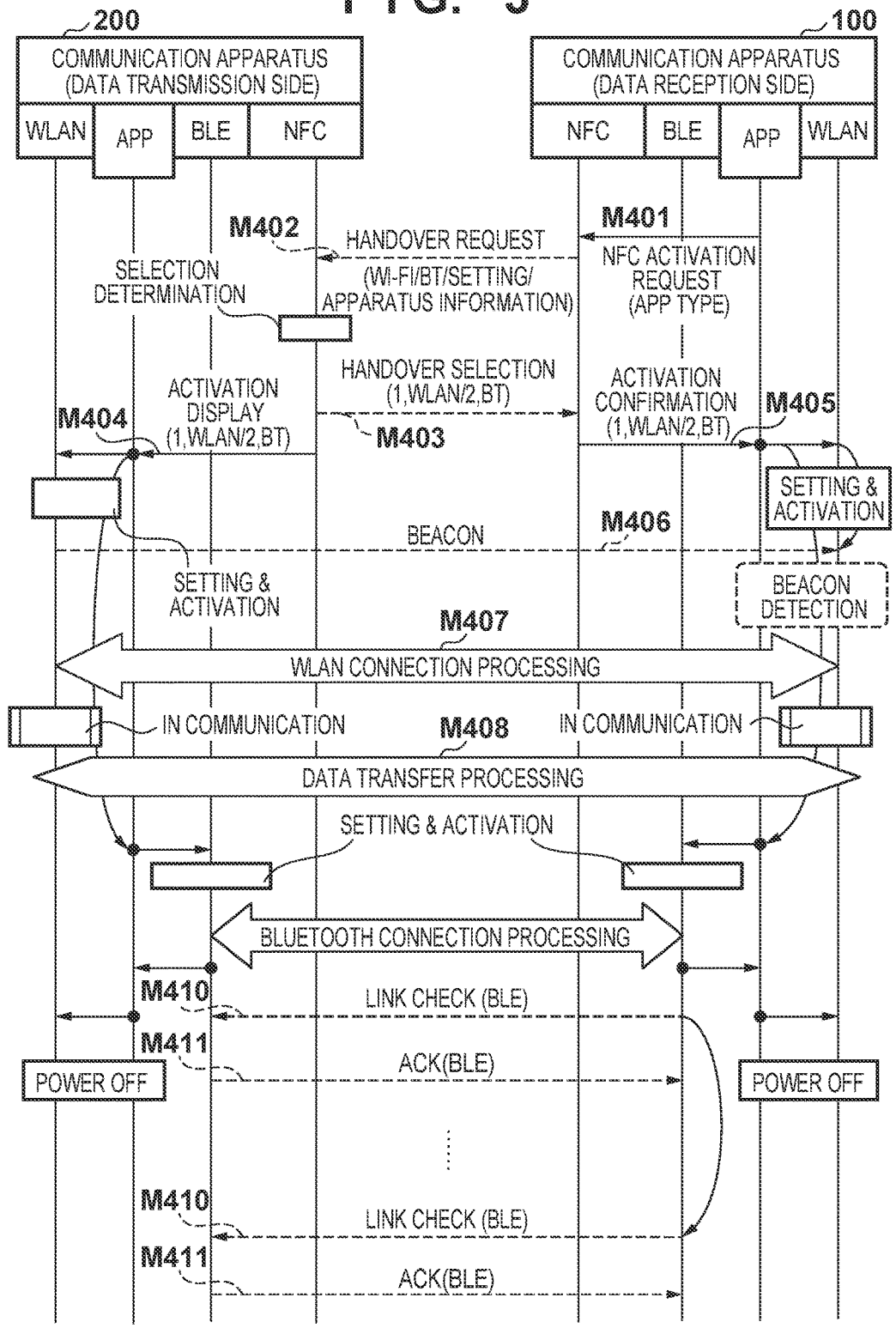
FIG. 3 is a view for showing a control sequence according to an embodiment of the present invention.

FIG. 3 is a view for showing a control sequence according to an embodiment of the present invention. When the user activates an image (data) transfer application by operating the communication apparatus 100, the communication control unit 1001 transmits an NFC activation request to the NFC communication unit 1004 (M401). In the NFC activation request, information necessary for determining the wireless communication unit to be used for the communication, such as, for example, an operation state, or an operation request of the activated application is added as an application type.

The NFC communication unit 1004, based on the NFC activation request received from the communication control unit 1001 (M401), transmits a handover request (M402) to the communication apparatus 200 which is the communication partner. In the handover request (M402), information indicating candidates for the wireless communication unit to be used upon the data transfer and an activation order, wireless communication unit setting information, and also apparatus information notified of by the application is included. Note, in the apparatus information, apparatus information indicating a function, or a state of the transmission source apparatus, for example, is included. Also, information for identifying a service to execute by the communication scheme after the handover (an image transfer service in this case) may be included in the handover request. The handover request (M402) is received by the NFC communication unit 2004 on the communication apparatus 200 side and is obtained by the information obtainment unit 2002.

The information analysis unit 2003 of the communication apparatus 200 analyzes the apparatus information that the information obtainment unit 2002 obtains. More specifically, the information analysis unit 2003, based on a state of the communication apparatus, which may be a functional requirement for data transfer that the communication control unit 1001 on the communication apparatus 100 side requests (data type, data size), the battery, for example, selects at least one of the wireless communication units to be activated, the activation order, the activation time, the setting information, for example. Also, the information analysis unit 2003, based on application information included in the apparatus information, determines a type of the application that the communication apparatus 100 has activated, processing that the activated application requests, for example. Then, the information analysis unit 2003 based on, for example, the type of the application that the communication apparatus 100 has activated, the processing that the activated application requests, selects at least one of the wireless communication units to activate, the activation order, the activation time, the setting information, for example.

Then, the information analysis unit 2003 transmits to the communication apparatus 100 the selection determination result as a handover selection (M403), and also notifies the communication control unit 2001 as an activation display (M404). In the handover selection (M403), the activated wireless communication units and the activation order are included as parameter information. Also, in the handover selection, communication parameters for connecting wirelessly to the communication apparatus 200 by the WLAN communication unit 2005 are included. Also, in the handover selection, a communication parameter for connecting wirelessly to the communication apparatus 200 by the BLE communication unit 2006 is included. Also, information for identifying a service to execute by the communication scheme after the handover (an image transfer service in this case) may be included in the handover selection. Similarly, in the activation display (M404), the activated wireless communication units and the activation order are included as parameter information. For example, the wireless communication units that are activated are the WLAN communication unit and the BLE communication unit, and the activation order is first the WLAN communication unit, and next the BLE communication unit. The WLAN communication unit of the communication apparatus 200 activates in accordance with the transmission of the handover selection message, and operates as an access point. Note, the WLAN communication unit of the communication apparatus 200 constructs a wireless network in accordance with the communication parameters included in the handover selection message, and initiates a beacon transmission.

The handover selection (M403) is received by the NFC communication unit 1004 on the communication apparatus 100 side and is obtained by the information obtainment unit 1002. The information analysis unit 1003 of the communication apparatus 100 analyzes parameter information of the handover selection that the information obtainment unit 1002 obtains (M403). Then, the communication control unit 1001 is notified of the analysis result in an activation confirmation (M405).

The communication control unit 2001 of the communication apparatus 200, having received the activation display (M404), and the communication control unit 1001 of the communication apparatus 200, having received the activation confirmation (M405), activate the WLAN communication units 2005 and 1005 and the BLE communication units 2006 and 1006 respectively in order, and data transfer is performed.

The WLAN communication unit 2005 transmits the beacon (M406), and the communication apparatus 100, having received that beacon, determines whether there is a network in accordance with the communication parameters included in the handover selection message based on that beacon. In a case where the communication apparatus 100 determines that there are communication parameters included in the handover selection message, WLAN connection processing is performed (M407). Note, configuration may be taken such that the communication apparatus 100 transmits a probe request in order to search for a network in accordance with the communication parameters included in the handover selection message. By receiving a probe response corresponding to this request, the communication apparatus 100 is able find a network to connect to (a communication partner apparatus to connect to). When data transfer processing (M408) ends, the power of the WLAN communication units 1005 and 2005 is turned off, and then Bluetooth connection processing (M409) is performed. After this, by a link check (BLE) (M410) and an ACK (BLE) (M411), it is confirmed whether the communication apparatus 100 and the communication apparatus 200 are within a distance at which communication with each other is possible.

<4. Processing that the Communication Apparatus Executes>

Figure 4:
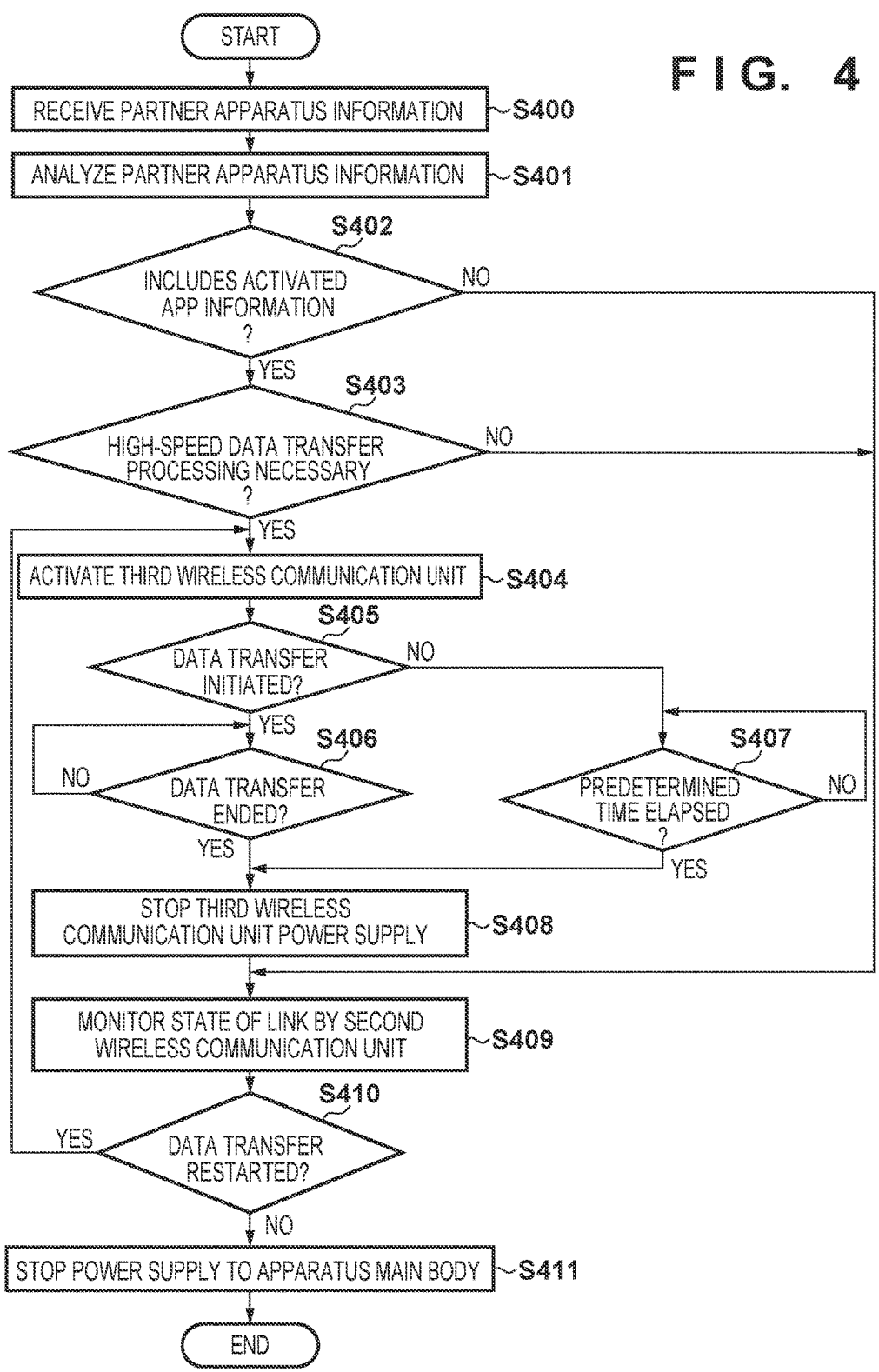
FIG. 4 is a flowchart for showing a processing procedure that a communication apparatus according to an embodiment of the present invention executes.

Next, with reference to the flowchart of FIG. 4, explanation will be given for a processing procedure that the communication apparatus 200 according to an embodiment of the present invention executes after receiving apparatus information.

As explained in FIG. 3, when the user activates, for example, an application for image (data) transfer, by operating the communication apparatus 100, the communication control unit 1001 transmits the NFC activation request (M401) to the NFC communication unit 1004. In this NFC activation request information necessary for determining the wireless communication units, such as an operation request of the activated application, an operation state, for example, is added as the application type. The NFC communication unit 1004, based on the received NFC activation request (M401), transmits the handover request (M402) to the communication apparatus 200 which is the communication partner. In this handover request (M402), candidates for the wireless communication unit desired upon the data transfer and an activation order, wireless communication unit setting information, and also apparatus information notified of by the application is included.

In step S400, the NFC communication unit 2004 on the communication apparatus 200 side receives the handover request (M402).

In step S401, the information analysis unit 2003 analyzes the apparatus information received from the communication apparatus 100. In the control sequence of FIG. 3, explanation was given for an example in which the information analysis unit 2003 performs an analysis of the handover request (M402), and an activation display (M404) is transmitted to the communication control unit 2001 as the analysis result, but the NFC communication unit 2004 or the communication control unit 2001 may determine the wireless communication unit to activate or the activation order based on the type of the apparatus information. In a case where the communication control unit 2001 performs the analysis, the analysis result may be returned from the communication control unit 2001 to the NFC communication unit 2004. The NFC communication unit 2004 transmits the handover selection (M403), in which the wireless communication units to activate and the activation order are made to be parameters, to the NFC communication unit 1004 on the communication apparatus 100 side.

In step S402, the communication control unit 2001 determines whether or not the result of the analysis by the information analysis unit 2003 is that information of the application activated on the communication apparatus 100 is included in the partner apparatus information. Note, configuration may be taken such that in step S402, it is determined whether a data transfer is performed immediately by the communication scheme after the handover. In the determination of step S402, in a case where the application information is included (step S402: Yes), the processing proceeds to step S403. On the other hand, in a case where the application information is not included (step S402: No), the processing proceeds to step S409.

In step S403, the communication control unit 2001 determines whether or not high speed data transfer processing is necessary based on the application information. In the application information, the type of the application that is activated, information relating to processing that the application requests, is included. The communication control unit 2001 is able to determine the processing that the communication partner apparatus requests from the information relating to the processing that the application requests. Also, in a case where the information relating to the processing that the application requests indicates that a data transfer is requested, information relating to the transmission target data type and the transmission target data size is included in the information relating to the processing that the application requests.

For example, in a case where the communication partner apparatus is requesting an image transfer by the application information, if the wireless communication unit used is not changed in a case where one thumbnail image is transferred and a case in which one large image of high image quality is transferred, even though the image data transfer is the same, the waiting time for the user becomes long and convenience suffers. It may be determined that high speed data transfer processing is necessary in a case where information of an application includes information of the size and the type of the data to be communicated, and the type of the data is a predetermined type and the size of the communication data is greater than or equal to a predetermined value. Also, in a case where data transfer processing is not necessary in the first place, there is no need for activation of the WLAN communication unit 2005, which is a faster third wireless communication unit.

In this way, the communication control unit 2001, based on the application information, is able to determine whether or not the communication partner apparatus is in a state in which data to be communicated by the WLAN communication is selected when the NFC communication is initiated. Then, the communication control unit 2001, in a case where the communication partner apparatus is in a state in which the data to be communicated by WLAN communication is selected when the NFC communication is initiated, determines that high speed data transfer processing is necessary. Also, the communication control unit 2001, in a case where the communication partner apparatus is not in a state in which the data to be communicated by WLAN communication is selected when the NFC communication is initiated, determines that high speed data transfer processing is not necessary.

Also, in step S403, the communication control unit 2001, based on whether or not the state is such that the data to be transmitted by the device itself upon initiation of the NFC communication is selected, may determine whether high speed data transfer processing is necessary or not. In other words, the communication control unit 2001, in a case where the state is such that the data to be transmitted by the device itself upon initiation of the NFC communication is selected, determines that high speed data transfer processing is necessary. Also, in a case where the communication control unit 2001 is not in a state in which the data to be transmitted by the device itself upon initiation of the NFC communication is selected, determines whether or not high speed data transfer processing is necessary based on information received by NFC from the communication partner apparatus.

In a case where the communication control unit 2001 determines, based on the information received by NFC from the communication partner apparatus, that the communication partner apparatus is requesting a data transfer, determines that high speed data transfer processing is necessary. In a case where the communication control unit 2001, determines based on the information received by NFC from the communication partner apparatus, that the communication partner apparatus is not requesting a data transfer, it is determined that high speed data transfer processing is not necessary.

Also, in step S403, the communication control unit 2001, in a case where a service to be executed by a communication scheme after the handover (for example, an image transfer service, a movie streaming playback service, a print service) is specified in the information received from the communication partner apparatus by NFC, may determine that high speed data transfer processing is necessary.

In a case where high speed data transfer processing is necessary (step S403: Yes), the processing proceeds to step S404. On the other hand, in a case where high speed data transfer processing is not necessary (step S403: No) the processing proceeds to step S409. Note, configuration may be taken such that the determination of step S403 is not performed.

In step S404, the communication control unit 2001 activates the WLAN communication unit 2005 as the further high speed third wireless communication unit. Here, in the communication apparatus 100, the communication control unit 1001, having received the activation confirmation (M414), activates the WLAN communication unit 1005 as the third wireless communication unit.

In step S405, the communication control unit 2001, after the WLAN communication unit 2005, which is the faster third wireless communication unit, is activated, monitors whether or not the data transfer is actually initiated. Note, the communication control unit 1001 performs monitoring in the communication apparatus 100 as well. In a case where the data transfer processing is initiated (step S405: Yes), the processing proceeds to step S406. On the other hand, in a case where the data transfer is not initiated (step S405: No) the processing proceeds to step S407.

In step S406, the communication control unit 2001 monitors for an end of the data transfer. Note, in the communication apparatus 100 as well, the communication control unit 1001 monitors for an end of the data transfer. In a case where the data transfer ends (step S406: Yes), the processing proceeds to step S408. On the other hand, in a case where the data transfer has not ended (step S406: No), the end of the transfer is awaited.

In step S407, the communication control unit 2001 determines whether or not a predetermined amount of time has elapsed without the data transfer being initiated. Note, the communication control unit 1001 similarly performs a determination in the communication apparatus 100. In a case where the data transfer is not initiated even though the predetermined amount of time has elapsed (step S407: Yes), the processing proceeds to step S408. On the other hand, in a case where the predetermined amount of time has not elapsed (step S407: No), the predetermined amount of time elapsing is awaited. Additionally, there are cases in which, depending on the application, it takes a long time until the data transfer is actually initiated from activation, and configuration may be taken so as to stop the power supply to the third wireless communication unit or to switch to a power saving mode such that the wireless communication unit does not consume unnecessary power.

In step S408, the communication control unit 2001 stops or puts into a power saving mode the third wireless communication unit by stopping the power supply to the WLAN communication unit 2005 or putting it into a power saving mode.

In step S409, the communication control unit 2001 activates the BLE communication unit 2006, and performs monitoring of the state of a link by the second wireless communication unit. Also, similarly, in the communication apparatus 100, the communication control unit 1001 activates the BLE communication unit 1006, and performs monitoring of a state of a link by the second wireless communication unit. Note, in a case of No in step S402, transition is made to step S409, and it can be determined that there is no request from the application side for the wireless communication unit. In such a case, the next instruction from the application may be awaited.

In step S410, the communication control unit 2001 determines whether or not the transfer of data for which high speed data transfer processing is necessary is restarted. Also, similarly, in the communication apparatus 100, the communication control unit 1001 determines whether or not the transferring is restarted. In a case where the transferring is restarted (step S410: Yes), the processing returns to step S404. Meanwhile, in a case where the transferring is not restarted (step S410: Yes), the processing proceeds to step S411. Note, a configuration may be taken in which, in a case where it is determined that data transfer is necessary, an activation instruction for the WLAN wireless function is communicated by the BLE communication to the communication partner apparatus. Note, the determination of step S410 may be made by the WLAN communication activation instruction being communicated by the BLE communication.

In step S411, the communication control unit 2001 stops the power supply to the main body of the communication apparatus 200. Also, similarly, in the communication apparatus 100, the communication control unit 1001 stops the power supply to the main body of the communication apparatus 100.

Note, the communication apparatus 200 may perform analysis based on apparatus information of the communication apparatus 200 itself in addition to the received apparatus information of the communication apparatus 100. For example, it is effective to analyze a battery capacity state of the communication apparatus 200, the amount of data to be transmitted, and also a signal condition measured when the wireless communication units communicate. Also, in a case where the communication control unit 2001 of the communication apparatus 200 receives a data transfer request message from the communication apparatus 101, configuration may be taken such that the third wireless communication unit (the WLAN communication unit 2005) is activated. In such a case, the communication apparatus 100 stops the power supply to the third wireless communication unit (the WLAN communication unit 1005) when a message indicating the end of the data transfer is received from the communication apparatus 200.

As explained above, by virtue of the present embodiment, activation of an appropriate wireless communication unit becomes possible by analyzing information specific to the apparatus upon an NFC handover, and unnecessary battery consumption can be reduced in a standby state other than a state in which data transfer is being performed in the communication apparatus. Also, by virtue of the present embodiment, it is possible to determine whether or not WLAN communication is executed immediately in a case where communication parameters for a WLAN communication and communication parameters for BLE communication are received in an NFC handover. In a case where the WLAN communication is not executed immediately upon the NFC handover, a WLAN function is not activated even if communication parameters for WLAN communication are received. Accordingly, unnecessary power consumption can be reduced. Also, in a case where WLAN communication is not executed immediately upon an NFC handover, BLE communication for which power consumption is relatively small is established. Accordingly, in a case where the WLAN communication is necessary, a data transfer can be executed efficiently while reducing power consumption because a communication of a WLAN activation instruction can be performed by BLE communication.

Also, because an activation state of an application of the communication apparatus is considered when a proximity operation is performed in a pairing operation, a special operation for performing a data transfer automatically as necessary becomes unnecessary, and the transfer operation becomes easy for the user.

Also, even in a case where after the pairing operation the peripheral wireless environment changes, it is possible to perform an optimal data communication by notifying of new wireless LAN parameters at a timing immediately preceding the data transfer using the BLE communication unit.

By virtue of the present invention, power consumption can be reduced in a standby state other than a state in which data transfer is being performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
a first communication unit configured to perform a communication that conforms to Bluetooth Low Energy;
a second communication unit configured to perform a communication that conforms to any one of IEEE802.11 series;
a start unit configured to start a communication by the second communication unit with an another communication apparatus, in a case where a start instruction is received from the another communication apparatus by the first communication unit;
a control unit configured to control the first communication unit such that a connection that conforms to Bluetooth Low Energy with the another communication apparatus is maintained after a communication by the second communication unit with the another communication apparatus is started by the start unit so that the communication apparatus communicates with the another communication apparatus using the maintained connection by the first communication unit after the communication started by the start unit is completed.

2. The communication apparatus according to claim 1, further comprising:
a sharing unit configured to share, between the communication apparatus and the another communication apparatus, by a communication, a communication parameter that is used when the communication by the second communication unit with the another communication apparatus is started by the start unit.

3. The communication apparatus according to claim 2, wherein the communication parameter is at least one of an SSID, an authentication mode, an encryption scheme, a key, and a MAC address.

4. The communication apparatus according to claim 1, further comprising:
a sharing unit configured to share, between the communication apparatus and the another communication apparatus, by a communication, a communication parameter that is used when the communication by the first communication unit with the another communication apparatus is started.

5. The communication apparatus according to claim 4, wherein the communication parameter is at least one of a Bluetooth address, a link key, a frequency hopping pattern, an authentication mode, an authentication key, an encryption scheme and an encryption a key.

6. The communication apparatus according to claim 1, wherein the start unit starts the communication between the another communication apparatus and the second communication unit, by connecting to the another communication apparatus that operates as an access point defined in any of IEEE802.11 series.

7. The communication apparatus according to claim 1, wherein the start unit starts the communication between the another communication apparatus and the second communication unit in a case where the another communication apparatus is detected by a communication of a probe request and a probe response or by a reception of a beacon.

8. The communication apparatus according to claim 1, wherein the second communication unit performs a communication for an image transfer service, a movie streaming playback service or a print service with the another communication apparatus, in the communication started by the start unit.

9. The communication apparatus according to claim 1, wherein the start unit starts a communication by the second communication unit with the another communication apparatus in a case where there is data that is to be communicated between the communication apparatus and the another communication apparatus.

10. The communication apparatus according to claim 1, wherein the start unit does not start a communication by the second communication unit with the another communication apparatus in a case where there is data that is to be communicated between the communication apparatus and the another communication apparatus and the size of the data is equal to or less than a predetermined value, and the first communication unit communicates with the another communication apparatus the data, the size of which is equal to or less than the predetermined value.

11. The communication apparatus according to claim 1, wherein the start unit does not start a communication by the second communication unit with the another communication apparatus in a case where data that is to be communicated between the communication apparatus and the another communication apparatus indicates a thumbnail, and the first communication unit communicates with the another communication apparatus the data.

12. The communication apparatus according to claim 1, further comprising:

a power saving unit configured to restrict a power supply to the second communication unit or put the second communication unit into a power saving mode in a case where the communication started by the start unit is completed.

13. The communication apparatus according to claim 1, further comprising:

an activation unit configured to put the second communication unit into an activation state in a case where a start instruction is received from the another communication apparatus by the first communication unit after a communication by the first communication unit with the another communication apparatus is started; and a non-activation unit configured to put the second communication unit into a non-activation state in a case where a communication by the second communication unit with the another communication apparatus is not started before a predetermined time elapses after the second communication unit is activated by the activation unit.

14. The communication apparatus according to claim 2, wherein the sharing unit shares, by a communication by the first communication unit with the another communication apparatus, a communication parameter that is used when the communication by the second communication unit with the another communication apparatus is started by the start unit, the communication parameter including at least one of an SSID, an authentication mode, an encryption scheme, a key, and a MAC address.

15. A method of controlling a communication apparatus comprising a first communication unit configured to perform a communication that conforms to Bluetooth Low Energy, and a second communication unit configured to perform a communication that conforms to any one of IEEE802.11 series, the method comprising:

starting a communication by the second communication unit with an another communication apparatus, in a case where a start instruction is received from the another communication apparatus by the first communication unit; and controlling the first communication unit such that a connection that conforms to Bluetooth Low Energy with the another communication apparatus is maintained after a communication by the second communication unit with the another communication apparatus is started in the starting so that the communication apparatus communicates with the another communication apparatus using the maintained connection by the first communication unit after the communication started in the starting is completed.

16. A non-transitory computer-readable storage medium storing a computer program for causing a computer to execute a method of controlling a communication apparatus comprising a first communication unit configured to perform a communication that conforms to Bluetooth Low Energy, and a second communication unit configured to perform a communication that conforms to any one of IEEE802.11 series, the method comprising:

starting a communication by the second communication unit with an another communication apparatus, in a case where a start instruction is received from the another communication apparatus by the first communication unit; and controlling the first communication unit such that a connection that conforms to Bluetooth Low Energy with the another communication apparatus is maintained after a communication by the second communication unit with the another communication apparatus is started in the starting so that the communication apparatus communicates with the another communication apparatus using the maintained connection by the first communication unit after the communication started in the starting is completed.

* * * * *